April 14, 1925.

L. J. STONE 1,533,673

WEEDING ATTACHMENT FOR CULTIVATORS

Filed Feb. 3, 1922

Inventor.
Louis J. Stone
By his Attorney
James F. Williamson

April 14, 1925.

L. J. STONE 1,533,673

WEEDING ATTACHMENT FOR CULTIVATORS

Filed Feb. 3, 1922     2 Sheets-Sheet 2

Inventor
Louis J. Stone
By his Attorney
James F. Williamson

Patented Apr. 14, 1925.

1,533,673

UNITED STATES PATENT OFFICE.

LOUIS J. STONE, OF HALLOCK, MINNESOTA.

WEEDING ATTACHMENT FOR CULTIVATORS.

Application filed February 3, 1922. Serial No. 533,742.

*To all whom it may concern:*

Be it known that I, LOUIS J. STONE, a citizen of the United States, residing at Hallock, in the county of Kittson and State of Minnesota, have invented certain new and useful Improvements in Weeding Attachments for Cultivators; and I do hereby declare the following to be a full, clear, and exact description of the invention, such as will enable others skilled in the art to which it appertains to make and use the same.

This invention relates to an attachment for a drill row cultivator, which attachment comprises a weeding device. It is the custom in planting corn, potatoes and other vegetables, to drill the same in rows, so that the plants are quite close together in a row and, hence, it is only possible to cultivate the plants in one direction, that is, by moving the cultivator between the rows. With this practice the cultivator does not clear the weeds springing up between the plants in the row.

It is an object of this invention to provide a device which can be drawn over the row of plants and which is provided with means for stirring the soil and uprooting the weeds springing up adjacent and between the plants in the line of the row.

It is a further object to provide such a device comprising a member having a substantially flat undersurface from which project soil piercing means.

It is still a further object of the invention to provide the device with means for varying the inclination of the soil piercing devices or pins, and means for holding said pins in the desired inclination.

These and other objects and advantages of the invention will be fully set forth in the following description made in connection with the accompanying drawings in which like reference characters refer to the same parts throughout the different views, and in which, Fig. 1 is a perspective view of a row cultivator having the device of the invention attached thereto;

Figure 1:
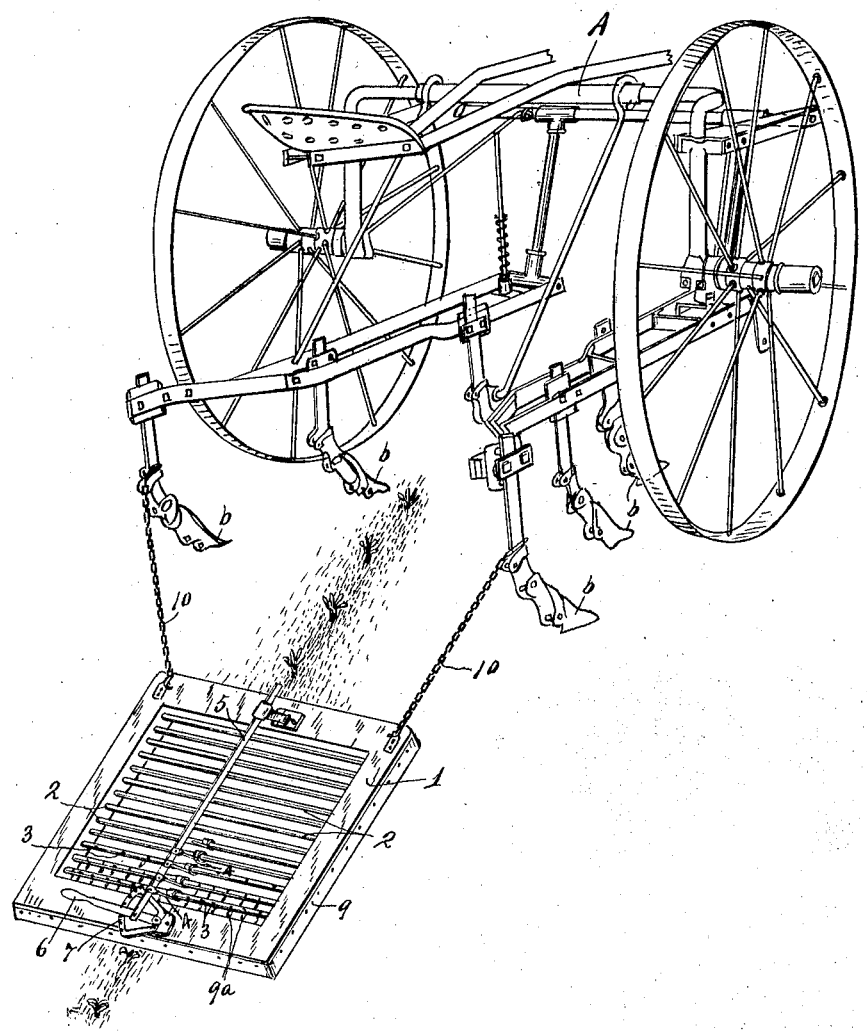

Referring to the drawings, a drill row cultivator of standard type is illustrated as A, equipped with the ground working shovels $b$ which shovels are adapted to pass along different lines between the rows of plants as the cultivator is moved lengthwise of and parallel with the rows.

Figure 2:
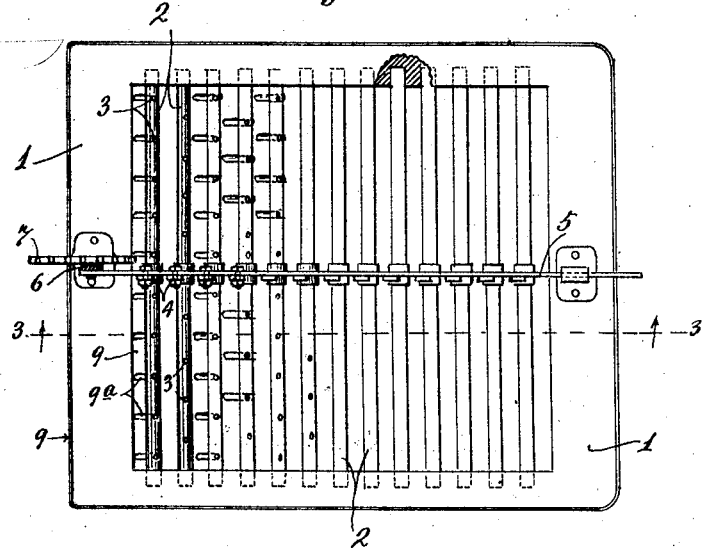
Fig. 2 is a plan view of the device.
Figure 3:
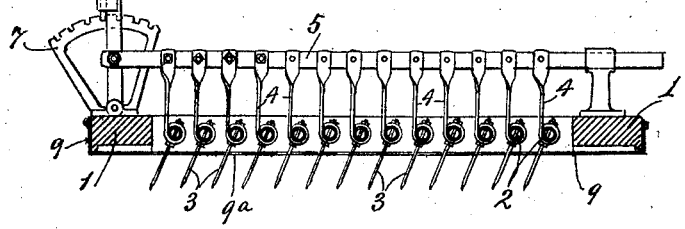
Fig. 3 is a view in vertical section taken on the line 3—3 of Fig. 2, as indicated by the arrows.
Figure 4:
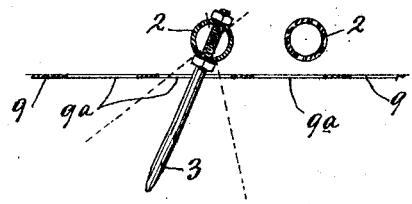
Fig. 4 is a partial vertical section illustrating an enlarged scale.

In accordance with this invention, a member is provided comprising a frame 1 which, in the embodiment illustrated, is shown as of flat rectangular form and which is made of metal or wood. This frame, as shown, comprises spaced side members, between which extend a plurality of rods 2 shown as being formed of pipe. These rods are mounted for oscillatory movement in the sides of the frame 1 and spaced soil piercing members in the shape of comparatively small pointed pins 3 are secured in said rods. While these pins can be secured in any desired manner, they are illustrated as shown in Fig. 4 as having their upper ends threaded and passed through opposite holes in the rods 2 and held in position by suitable check nuts threaded thereon. A strap member 4 is secured to each of the rods 2 substantially at the center thereof having its end wrapped around and bolted or riveted through the said rod. These members 4 project substantially vertically and are turned at a right angle at the upper ends and pivotally secured by suitable pivot bolts to a bar 5 extending longitudinally over the top of the member 1. This bar is pivotally connected at the rear end of the frame to a lever 6 pivoted to a notched quadrant 7 which, in turn, is bolted to the top of the member 1. The lever 6 is provided with the usual locking pawl adapted to engage with the quadrant 7, which pawl is operated by a grip lever 8 pivoted to the lever 6. The lower surface of the member 1 is covered by a metal sheet 9 which is preferably bent up at the sides of said member and secured by suitable nails. This sheet metal 9 is provided with spaced longitudinal slots 9ª of a width to accommodate the pins 3 to permit their swinging movement to various inclinations. It will be noted from an inspection of Fig. 2 that the pins 3 are arranged in staggered relation in adjacent rows.

The device is adapted to be attached to the rear of the cultivator A by chains 10 attached to small brackets secured at the front and sides of the member 1 and which diverge from said member to their point of connection with the cultivator, the same being shown as connected to the shovel bars.

In operation, the device will be attached to the cultivator, as illustrated, and will drag over the row. Owing to the diverging arrangement of the connecting members 10, the device will maintain a course in line with the cultivator and will travel at the rear and centrally thereof so as always to be kept centered over the row. As the device drags over the row, the pins 3 will pierce the soil and stir the same and any small weeds springing up in the row adjacent to or between the plants will be effectively uprooted and destroyed.

As is well known, small plants are often covered up by the cultivator. The device of this invention acts efficiently to uncover these plants as it moves over the row in the wake of the cultivator.

The device has proven very successful in clearing potatoes from the weeds so located. The device has been thoroughly demonstrated in practice and it is found that no damage is done to the plants in the row. This is due largely to the fact that the said plants have attained a much greater growth than the weeds which it is desired to destroy. The stalks of the plants also are of sufficient growth to be deflected to one side or the other of the pins 3 so that the same are not uprooted. In a patch of potatoes or other vegetable, a new crop of young weeds spring up after each rain and these young weeds are effectively cleared by means of this device. The plants will be laid down as the device passes thereover, but in a short time will regain their erect position. In potato growing sections, particularly in the Northwest where this device has been used, the weeds get such a start in the row that it has been necessary to go over the patch with a cultivator to remove the weeds before the digging operations could be commenced. This device was used to clear the weeds from a large tract and by the use of the device during the cultivating operations, the weeds were so effectively removed that such mowing of the patch was unnecessary.

Applicant believes himself to be the first to provide a device having closely spaced teeth depending from an area thereof, which area is drawn directly over a row of plants. In all devices of the prior art, where tools of any kind were drawn along a row of growing plants there has been a portion of the device free from teeth, and this portion of the device moved over the row of plants.

As stated, the inclination of the members 3 can be varied by swinging the lever 6 which is disposed in convenient position to be reached by the operator. The uprooting or tearing effect of the members 3 can be suitably varied by varying this inclination.

From the above description it is seen that applicant has provided a simple and efficient means for effectively clearing the weeds from rows of vegetables, which weeds are located in a place where they have heretofore been reached only with great difficulty and labor. The device is simple and can be easily and inexpensively made. The same is used during the usual and necessary cultivating operations so that actually no additional labor is involved in clearing the weeds.

It will, of course, be understood that various changes may be made in the form, details and arrangement of the parts of the device without departing from the scope of applicant's invention, which, generally stated, consists in the matter shown and described and set forth in the appended claims.

What is claimed is:

1. A device adapted to be drawn over a row of plants in the rear of the cultivator operating between the rows comprising, a member having a flat undersurface of considerable area and a multiplicity of small short sharpened rigid pins depending from said surface, said pins being arranged closely adjacent each other so that they will stir the ground and uproot any small weeds growing in or adjacent the row and will uncover any plants covered by the cultivator.

2. A device adapted to be drawn over a row of young plants comprising, a rectangular frame having a flat undersurface, a multiplicity of small rigid pins projecting downwardly from said surface, said pins being in closely spaced relation so that as they travel over the row they will stir the ground and uproot any small weeds growing in or adjacent the row, said pins and member being of such size that the plants in the row will not be uprooted.

3. The combination with a cultivator having cultivating means operating on the soil at each side of a row of plants, to stir the same and destroy the weeds, of a device traveling in the rear of the cultivator and over said row of plants and comprising a flat surface having a comparatively large area, spaced rigid pins depending from said surface constructed and arranged to uproot any weeds growing in or adjacent said row, and flexible means diverging from said device and connected to the cultivator for drawing and guiding said device to keep the same over said row.

4. The structure set forth in claim 1, said pins being inclined rearwardly and means for varying the inclination thereof.

5. A device adapted to be drawn over a row of plants to remove weeds comprising a flat surface adapted to travel close to the ground and having depending from its undersurface a multiplicity of small short spaced rigid pins, said pins being arranged in close proximity.

In testimony whereof I affix my signature.

LOUIS J. STONE.